US006929491B1

(12) United States Patent
Chi-Te

(10) Patent No.: US 6,929,491 B1
(45) Date of Patent: Aug. 16, 2005

(54) CARD CONNECTOR

(75) Inventor: Kuan Chi-Te, Shulin (TW)

(73) Assignee: L&K Precision Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 10/989,345

(22) Filed: Nov. 17, 2004

(51) Int. Cl.$^7$ ............................................. H01R 13/62
(52) U.S. Cl. ..................................................... 439/159
(58) Field of Search ............................... 439/152, 155, 439/159, 160, 607

(56) References Cited

U.S. PATENT DOCUMENTS

| | | | | |
|---|---|---|---|---|
| 6,394,827 B2 * | 5/2002 | Nogami | ...................... | 439/159 |
| 6,419,508 B2 * | 7/2002 | Hashimoto | .................. | 439/159 |
| 6,802,726 B2 * | 10/2004 | Chang | ........................ | 439/159 |

* cited by examiner

Primary Examiner—Tho D. Ta
Assistant Examiner—James R. Harvey
(74) Attorney, Agent, or Firm—Troxell Law Office, PLLC

(57) ABSTRACT

A card connector has an insulative frame, a plurality of conductive terminals received in the insulative frame, an eject device assembled on the insulative frame and a shell covering the insulative frame. The eject device includes a slider, a guiding pole, a latch and a resilient element. The latch is of U shape and has a mounting arm and a latching arm movably connected with each other and spaced an appropriate distance from each other. The mounting arm is retained on the slider. The latching arm forms an arcuate end for corresponding to a cutout of the card, and an abutting portion adjacent to the arcuate end. During insertion of the card into the card connector, the arcuate end of the latching arm anchors a cutout of the card, driving the slider moves along the insulative frame until the card arrives at a predetermined final position. An abutting sheet depends downwardly from a top of the shell and adjacent to the eject device. The abutting sheet is positioned between the mounting arm and the latching arm when the card moves to the predetermined final position. The card is retained in the card connector when it is in the predetermined final position, thereby effectively preventing from exterior shock and assuring reliable signal transmission.

12 Claims, 4 Drawing Sheets

CARD CONNECTOR

BACKGROUND OF THE INVENTION

1. Field of the Invention

The present invention relates to a card connector, and particularly to a Push—Push type card connector which is used to communicate between an electronic card and a mainboard.

2. Related Art

Push—Push type connectors are often used to communicate between an electronic card and a mainboard, which allows the card inserted in or ejected out only by pressing the electronic card. U.S. Pat. No. 6,520,784 discloses such a card connector. The card connector includes a connector body receiving a plurality of terminals therein, an eject device assembled on the connector body for guiding an electronic card inserted in or ejected out, and a metal shell for covering the housing. However, the electronic card cannot be fixed when it is received in the eject device. Especially under undesired environment or exterior shock, the card tends to displace, resulting in improper contact between the conductive terminals and the mainboard and even unstable signal transmission. Additionally, in such a design, the conductive terminals are apt to wear down.

SUMMARY OF THE INVENTION

Accordingly, an object of the present invention is to provide a card connector which guides an electronic card inserted in or ejected out and which firmly retains the card when the card reaches a predetermined final position thereby effectively protecting from exterior shock.

The card connector comprises an insulative frame, a plurality of conductive terminals received in the insulative frame, an eject device assembled on the insulative frame and a shell covering the insulative frame.

The eject device includes a slider, a guiding pole, a latch and a resilient element. The slider defines a guiding groove proximate to an end thereof for guiding the card inserted in or ejected out. The guiding pole has an end pivotably mounted on the insulative frame, and an opposite end slidably accommodated in the guiding groove. The latch is of U shape and has a mounting arm and a latching arm movably connected with each other and spaced an appropriate distance from each other. The mounting arm is assembled on the slider and adjacent the guiding groove. The latching arm forms an arcuate end for corresponding to a cutout of the card, and an abutting portion adjacent to the arcuate end. During insertion of the card into the card connector, the arcuate end of the latching arm anchors the cutout of the card, driving the slider to move along the insulative frame until the card arrives at a predetermined final position.

An abutting sheet depends downwardly from a top of the shell and adjacent to the eject device, when the card moves to a predetermined final position, the abutting sheet of the shell is positioned between the mounting arm and the latching arm and stops the abutting portion of the latching arm, limiting movement of the latching arm. Thus the card is retained in the predetermined final position unless extra operation, effectively preventing from exterior shock and assuring reliable signal transmission. When the abutting portion of the latching arm is put apart from the abutting sheet of the shell, the latching arm is movable relative to the mounting arm, allowing the card ejected out of the card connector.

DESCRIPTION OF THE PREFERRED EMBODIMENTS

Figure 1:
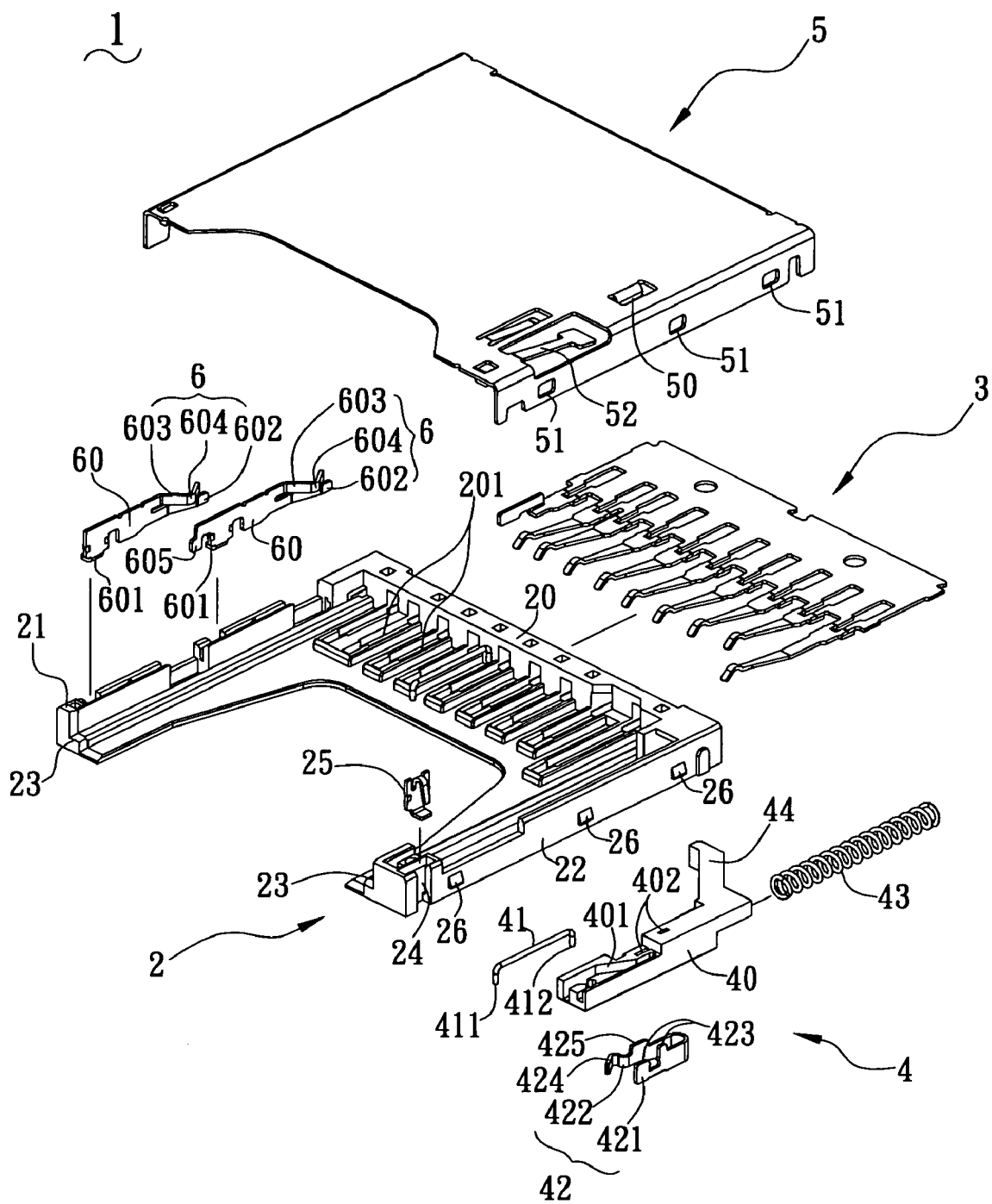
FIG. 1 is an exploded view of a card connector of the present invention.

With reference to FIG. 1, a card connector 1 of the present invention comprises an insulative frame 2, a plurality of conductive terminals 3 received in the insulative frame 2, an eject device 4 and a shell 5.

The insulative frame 2 includes a housing 20 and a pair of side posts 21, 22 at opposite sides of the housing 20. A plurality of passageways 201 is defined in the housing 20 for receiving the conductive terminals 3 therein. The side posts 21, 22 respectively define inserting slots 23 which are opposing to each other for accommodating an electronic card 7 therebetween. A switch 6 is mounted on the side post 21 for controlling write-enable and positioning-prompt functions of the card 7. The switch 6 includes a pair of spring sheets 60 which have the same structure. Each spring sheet 60 has a soldering end 601 at an end thereof, and a forked end (not labeled) at an opposite end thereof. The forked end has a contact portion 602 and a connecting portion 603. The connecting portion 603 substantially projects inwardly to form a curved end 604. In normal state, the contact portions 602 disengage from predetermined electrodes 605, 606. While the contact portions 602 engage with the predetermined electrodes 605, 606, the connecting portions 603 are pressed by the card 7. In this embodiment, the electrode 605 is formed on an end of a spring sheet 60, and the electrode 606 is formed on an end of a conductive terminal 3. The side post 22 defines a recess 24 at an outward side thereof for receiving a grounding sheet 25. A plurality of locking portions 26 is formed at outward sides of side posts 21, 22, respectively.

The eject device 4 is assembled on the side post 22, and includes a slider 40, a guiding pole 41, a latch 42 and a resilient element 43. The slider 40 defines a guiding groove 401 proximate to an end thereof for guiding the card 7 inserted in or ejected out. A link arm 44 extends from an end of the slider 40 and is opposite to and far from the guiding groove 401. The link arm 44 forms an angle relative to the slider 40 for fitting with a slant edge of the card 7 thereby preventing from improper insertion thereof. The slider 40 further defines a plurality of notches 402 adjacent the guiding groove 401. The guiding pole 41 has an end pivotably mounted on the side post 22 (referring to FIGS. 6 and 7), and an opposite end slidably accommodated in the guiding groove 401. The latch 42 is of U shape and has a mounting arm 421 and a latching arm 422 movably connected with each other and spaced an appropriate distance from each other. The mounting arm 421 is mounted on the slider 40, and forms a plurality of barbs 423 on an edge thereof for interferentially fitting with the notches 402. The latching arm 422 forms an arcuate end 424 for corresponding to a cutout 70 of the card 7 (referring to FIG. 7), and an abutting portion 425 adjacent to the arcuate end 424. In this embodiment, the resilient element 43 is a compressed spring for providing return force of the slider 40.

Figure 4:
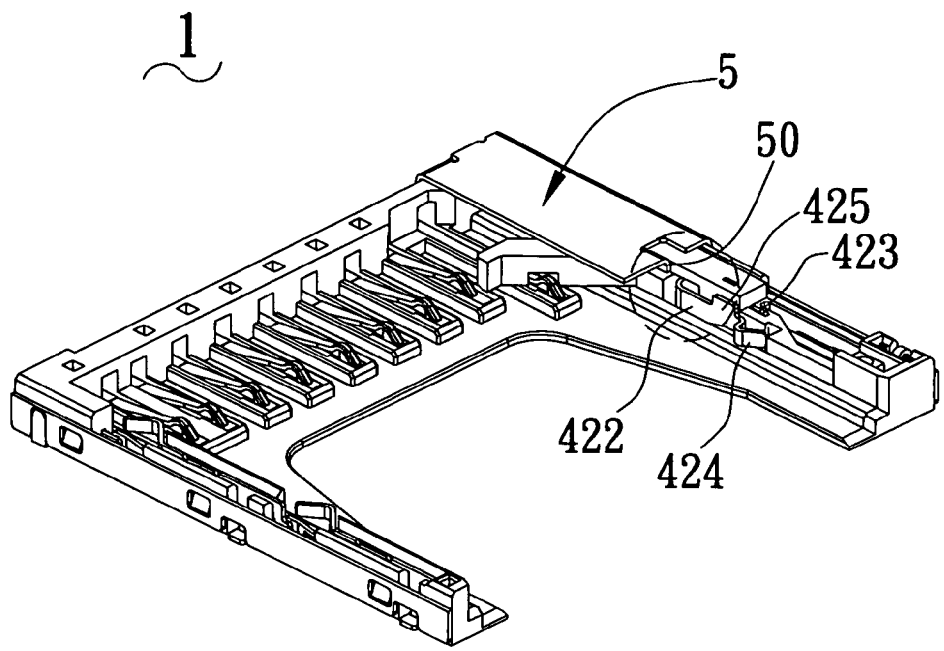
FIGS. 4–5 are assembled views of the card connector, wherein a part thereof is removed to show an eject device clearly.
Figure 5:
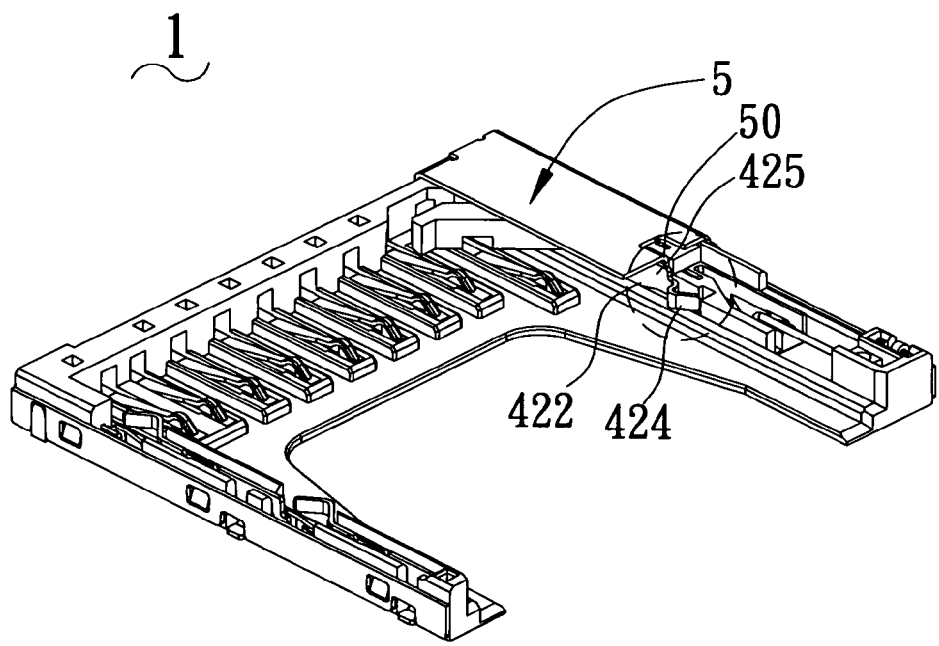

The shell 5 is substantially rectangular, and covers the housing 20, the side posts 21, 22 and the card 7 when the card 7 is received in the card connector 1. An abutting sheet 50 depends downwardly from a top of the shell 5 and adjacent to the eject device 4. In this embodiment, the abutting sheet 50 is directly stamped from the shell 5, and is arranged adjacent the guiding pole 41. Combining with FIG. 4, the abutting sheet 50 is positioned between the mounting arm 421 and the latching arm 422 when card 7 moves to a predetermined final position. A tongue 52 is stamped from a top of the shell 5 for pressing against the guiding pole 41 of the eject device 4. A plurality of locking holes 51 is defined in opposite sides of the shell 5.

Figure 3:
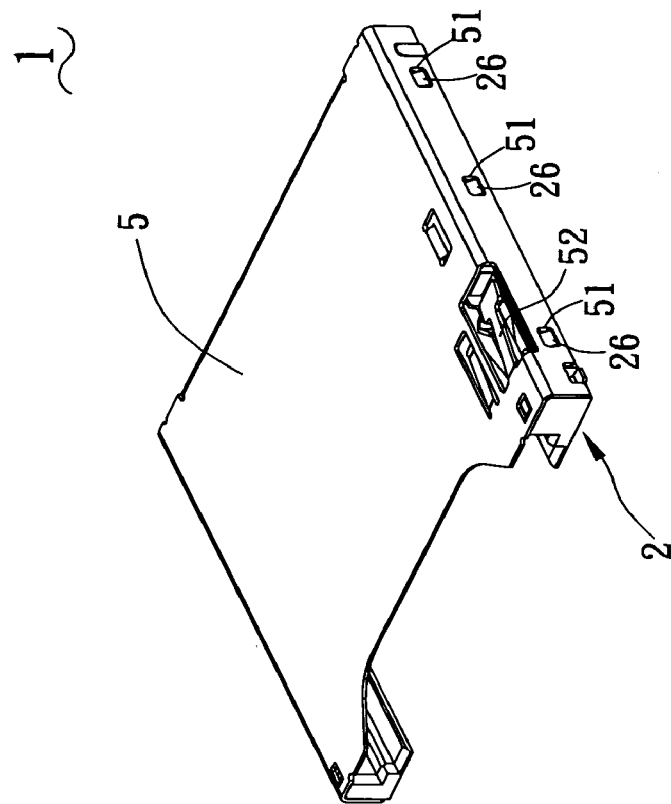
FIG. 3 is an assembled view of the card connector of FIG. 1.
Figure 2:
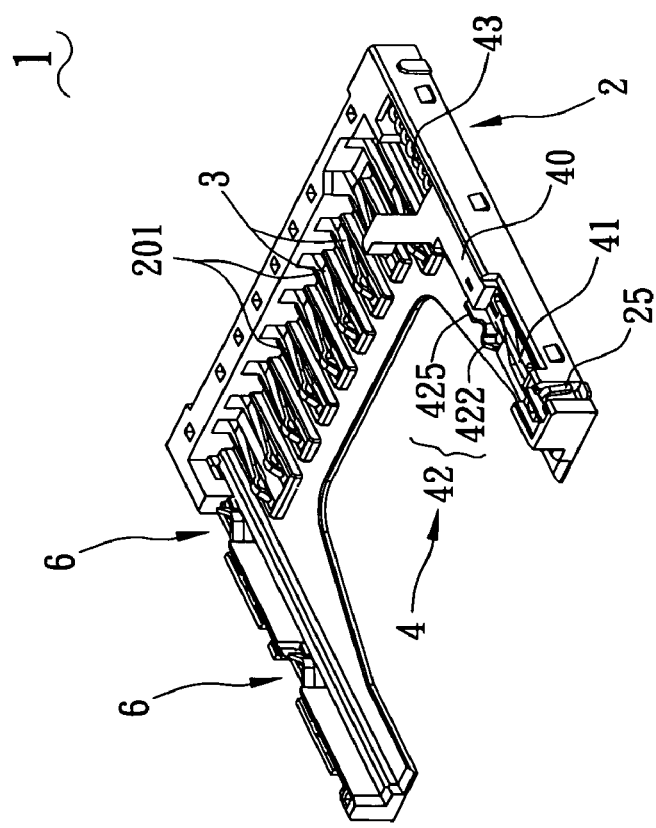
FIG. 2 is an assembled view of an insulative frame of the card connector of FIG. 1.

In combination with FIGS. 2 and 3, in assembly, the conductive terminals 3 are received in the passageways 201. The slider 40, the guiding pole 41, the latch 42, the resilient element 43 and the switch 6 are assembled on the insulative frame 2 in sequence. The locking portions 26 of the insulative frame 2 locks with the locking holes 51 of the shell 5.

Figure 6:
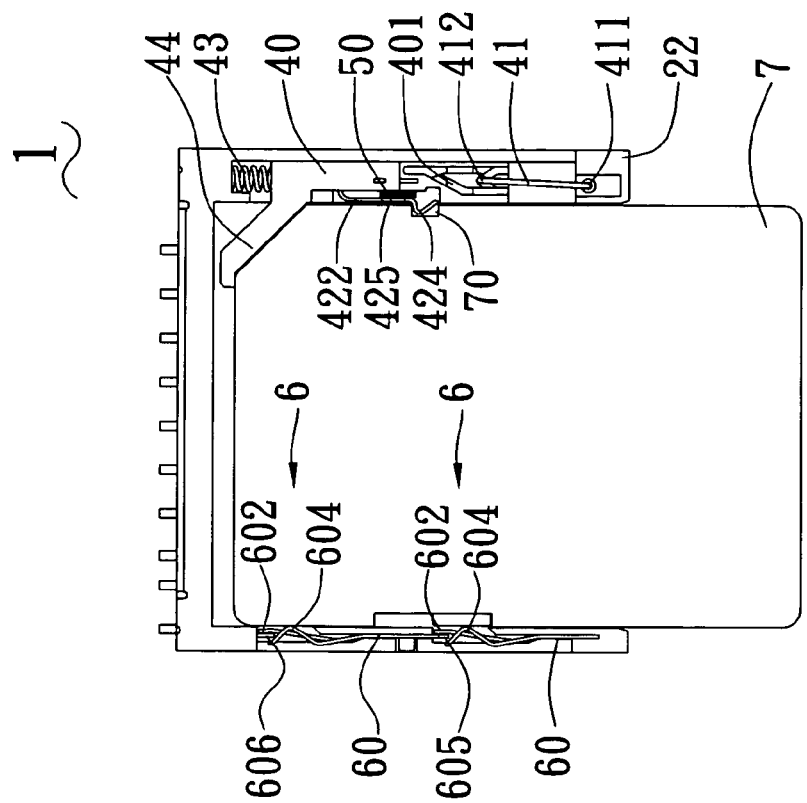
FIGS. 6–7 are assembled views of the card connector and a card, wherein a part of the card connector is removed to show the eject device clearly.
Figure 7:
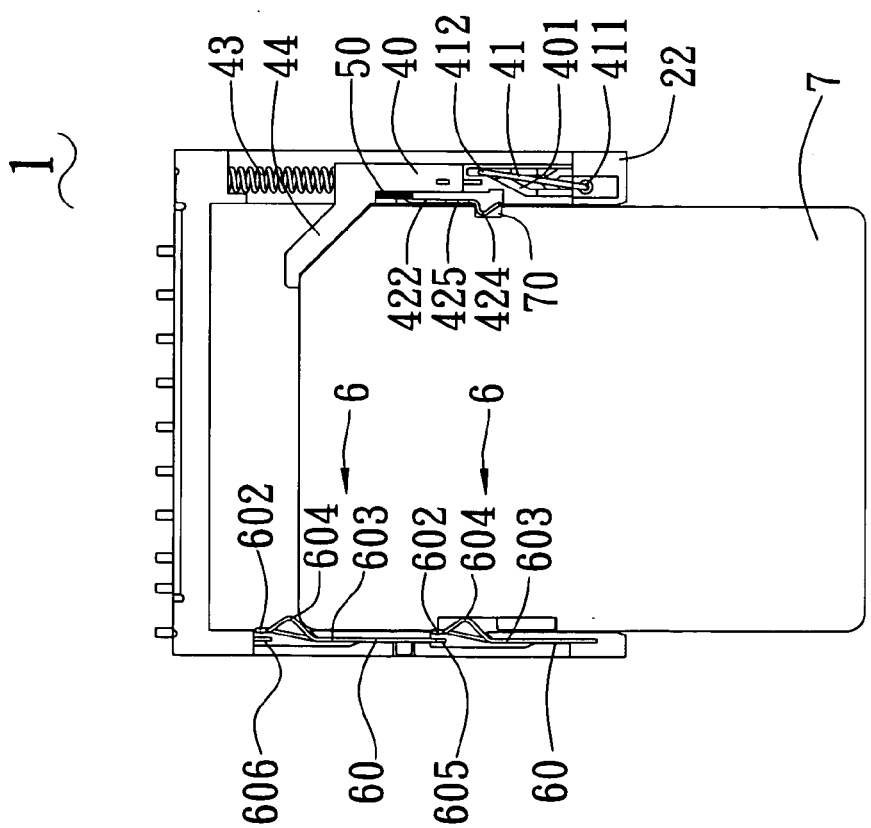

Further referring to FIG. 6, the card 7 is inserted into the card connector 1. The arcuate end 424 of the latching arm 422 abuts against the cutout 70 at a side of the card 7, and the curved end 604 of the spring sheet 60 abuts against an opposite side of the card 7. Meanwhile the abutting portion 425 of the latching arm 422 is relatively far from the abutting sheet 50 of the shell 5, allowing the latching arm 422 movable relative to the mounting arm 421. The spring sheets 60 of the switch 6 are spaced from each other. During insertion of the card 7 into the card connector 1, the arcuate end 424 of the latching arm 422 anchors the cutout 70 of the card 7, driving the slider 40 moves along the side post 22. Referring to FIG. 7, the card 7 arrives at a predetermined final position. The abutting sheet 50 stops the abutting portion 425, limiting movement of the latching arm 422. Thus the card 7 is retained in a predetermined final position unless extra operation, effectively preventing from exterior shock and assuring reliable signal transmission. Simultaneously, the connecting portions 603 of the spring sheets 60 press the contact portions 602. The contact portions 602 successfully contact the electrodes 605, 606, activating write-enable and positioning-prompt functions of the card 7. When the abutting portion 425 of the latching arm 422 is put far from the abutting sheet 50 of the shell 5, the latching arm 422 is movable relative to the mounting arm 421, allowing the card 7 ejected out of the card connector 1.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A card connector for allowing an electronic card inserted in or ejected out by performing push—push operation, comprising:
   an insulative frame having a housing and a pair of side posts at opposite sides of the housing, a plurality of passageways being defined in the housing for receiving conductive terminals therein, each side post defining an inserting slot for receiving the card;
   an eject device assembled on one of the side posts, including:
      a slider defining a guiding groove proximate to an end thereof for guiding the card inserted in or ejected out, a link arm being formed on the slider and far from the guiding groove;
      a guiding pole having an end pivotably mounted on the one of the side posts, and an opposite end movably accommodated in the guiding groove;
      a latch having a mounting arm and a latching arm movably connected with each other and spaced an appropriate distance from each other, the mounting arm being mounted adjacently on the guiding groove, the latching arm forming an arcuate end and an abutting portion adjacent to the arcuate end; and
      a resilient element for providing return force of the slider; and
   a shell assembled on a top of the insulative frame and covering at least the housing and the side posts, an abutting sheet depending from a top of the shell and adjacent to the eject device, the abutting sheet being positioned between the mounting arm and the latching arm when the card moves to a predetermined final position.

2. The card connector as claimed in claim 1, wherein the latch is configured of U shape.

3. The card connector as claimed in claim 2, further comprises a switch mounted on the one of the side posts for controlling write-enable and positioning-prompt functions of the card.

4. The card connector as claimed in claim 3, wherein the switch includes a pair of spring sheets which have the same structure, each spring sheet having a soldering end at an end thereof and a forked end at an opposite end thereof, wherein the forked end has a contact portion and a connecting portion, the connecting portion substantially projecting inwardly to form a curved end, and wherein the contact portions disengages from electrodes in normal state, while the contact portions engage with the electrodes when the connecting portions are pressed by the card.

5. The card connector as claimed in claim 1, wherein the abutting sheet is directly stamped from the shell, and is arranged adjacent the guiding pole.

6. The card connector as claimed in claim 1, wherein the shell is rectangular and covers the housing, the side posts and the card when the card is received in the card connector.

7. The card connector as claimed in claim 1, wherein the one of the side posts defines a recess at an outward side thereof, and a grounding sheet is assembled on the recess and adjacent to the guiding groove of the eject device.

8. The card connector as claimed in claim 1, wherein the link arm forms an angle relative to the slider for fitting with a slant edge of the card thereby preventing from improper insertion thereof.

9. The card connector as claimed in claim 1, wherein the resilient element is a compressed spring.

10. The card connector as claimed in claim 1, wherein the slider defines a plurality of notches therein, and wherein the mounting arm forms a plurality of barbs on an edge thereof for interferentially fitting with the notches.

11. The card connector as claimed in claim 1, wherein a plurality of locking portions is formed at opposite sides of the insulative frame, and a plurality of locking holes is defined in opposite sides of the shell for cooperating with the locking portions.

12. The card connector as claimed in claim 1, wherein a tongue is stamped from a top of the shell for pressing against the guiding pole of the eject device.

* * * * *